United States Patent Office.

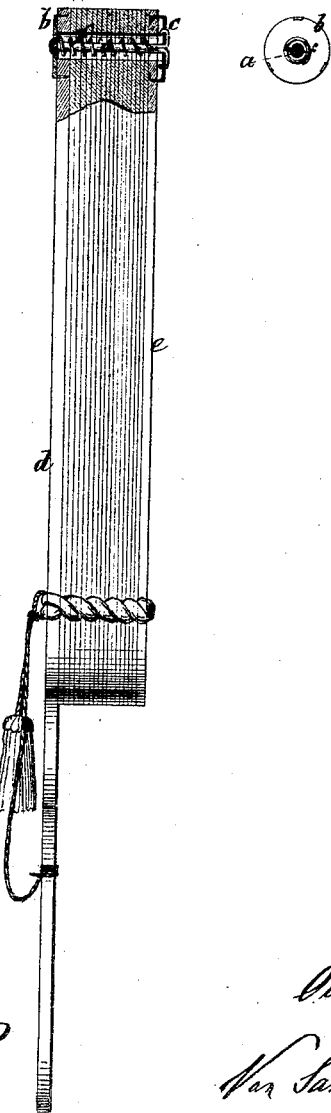

OTTO BRUECK, OF NEW YORK, N. Y.

Letters Patent No. 108,236, dated October 11, 1870.

IMPROVEMENT IN SPRING FANS.

The Schedule referred to in these Letters Patent and making part of the same.

*To all whom it may concern:*

Be it known that I, OTTO BRUECK, of the city, county and State of New York, have invented a new and useful Improvement in Spring Fans; and I do hereby declare the following to be a full, clear, and exact description thereof, which will enable those skilled in the art to make and use the same, reference being had to the accompanying drawing forming part of this specification, in which drawing—

Figure 1 represents a transverse section of this invention.

Figure 2 is a detached section of the spring, with its guide-pin and cap.

Similar letters indicate corresponding parts.

This invention relates to an improvement in that class of fans for which a patent was granted to O. R. Nitsch June 8, 1869, No. 91,156, which patent was assigned in full to the firm of Brueck Brothers, which firm consists of myself and my brother.

In manufacturing fans under the above-named patent of Mr. Nitsch, we have heretofore used a coiled spring inclosed in one of the caps, and fastened at one end to said cap and at the other end to the pin on which the leaves of the fan swing in being opened and closed.

In carrying out this plan, it was necessary to make the cap containing the spring sufficiently deep to afford room for the spring, and, furthermore, a spring of that kind is expensive and difficult to fasten to the cap and to the supporting pin.

Instead of inclosing the spring in the cap, I have therefore adopted the plan to coil said spring round the supporting pin, extending it throughout the entire length of said pin, or nearly so, and made of wire instead of a flat strip of steel, as heretofore, whereby I am enabled to reduce the cost of the article sixty-six per-cent.; that is to say, where we had to pay eighteen dollars per gross of springs, with their supporting pins and plates, I can now produce the same at six dollars per gross.

In the drawing, the letter *a* designates the supporting pin, which is inserted loosely at one end in a plate, *b*, while its other end is firmly secured in a similar plate, *c*. The plate *b* is secured to the handle, *d*, of the fan, while the plate *c* is fastened to the outer leaf or cover, *e*, the pin *a* passing through and forming the fulcrum of all the leaves of the fan, as shown in fig. 1. By turning the outer leaf *e*, therefore, the supporting pin is compelled to turn in the plate *b*.

Round the pin *a*, and extending throughout its entire length, or nearly so, I coil the spring *f*, by preference made of brass wire, and one end of this spring I fasten to the plate *b*, while its other end is fastened to the supporting pin as shown.

By turning the outer leaf *e* in the proper direction, therefore, the spring is wound up, and when said outer leaf is again released, it is carried back to its original position by the action of the spring.

This arrangement is applicable to circular or to semicircular fans, with equal advantage.

I distinctly disclaim everything shown and described in the patent of O. R. Nitsch above referred to, considering my present invention simply as an improvement on the device shown in said patent of Nitsch, whereby I am enabled to reduce the cost of manufacturing a spring fan as previously stated.

What I claim as new, and desire to secure by Letters Patent, is—

The spring coiled round the supporting pin *a*, and extending throughout the entire length of the same, or nearly so, as shown, in combination with the plates *b c*, and the leaves of a fan, all as set forth.

This specification signed by me this 10th day of September, 1870.

OTTO BRUECK.

Witnesses:
W. HAUFF,
E. F. KASTENHUBER.